(12) United States Patent
Muto et al.

(10) Patent No.: US 12,061,584 B2
(45) Date of Patent: *Aug. 13, 2024

(54) ILLEGAL CONTENT SEARCH DEVICE, ILLEGAL CONTENT SEARCH METHOD, AND PROGRAM

(71) Applicant: NIPPON TELEGRAPH AND TELEPHONE CORPORATION, Tokyo (JP)

(72) Inventors: Hiroko Muto, Tokyo (JP); Takahito Kawanishi, Tokyo (JP); Osamu Yoshioka, Tokyo (JP); Ryo Kitahara, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 987 days.

This patent is subject to a terminal disclaimer.

(21) Appl. No.: 17/041,060

(22) PCT Filed: Feb. 27, 2019

(86) PCT No.: PCT/JP2019/007497
§ 371 (c)(1),
(2) Date: Sep. 24, 2020

(87) PCT Pub. No.: WO2019/187920
PCT Pub. Date: Oct. 3, 2019

(65) Prior Publication Data
US 2021/0026930 A1    Jan. 28, 2021

(30) Foreign Application Priority Data

Mar. 27, 2018 (JP) .................................. 2018-059681

(51) Int. Cl.
*G06F 16/22* (2019.01)
*G06F 16/242* (2019.01)
(Continued)

(52) U.S. Cl.
CPC ............ *G06F 16/22* (2019.01); *G06F 16/242* (2019.01); *G06F 16/245* (2019.01);
(Continued)

(58) Field of Classification Search
CPC ........ G06F 21/10; G06F 16/22; G06F 16/242; G06F 16/245; G06F 40/58; G06F 40/289; G06F 21/1015
See application file for complete search history.

(56) References Cited

U.S. PATENT DOCUMENTS

| 8,677,505 B2* | 3/2014 | Redlich ................. H04L 9/3271 715/255 |
| 9,712,536 B2* | 7/2017 | Hashimoto ........... H04L 63/101 |

(Continued)

FOREIGN PATENT DOCUMENTS

| JP | 2013-8372 | 1/2013 |
| KR | 10-1800373 | 11/2017 |
| WO | 2008146813 A1 | 4/2008 |

OTHER PUBLICATIONS

U.S. Appl. No. 17/041,053, filed Sep. 24, 2020.*
(Continued)

*Primary Examiner* — Hosuk Song (57) ABSTRACT

An objective of the present invention is to make a search for illegal (illegitimate) content more efficient. The illegitimate content relates to content posted by an unauthorized user without a legitimate ownership of the content. An illegitimate content search device according to the present invention comprises: a query generation dictionary storage part for storing a query generation dictionary for generating a (Continued)

search query used in searching for illegitimate content; a query generation dictionary creation part for extracting, from a title of illegitimate content, associated wording being associated with wording included in a title of legitimate content, and registering the extracted associated wording in the query generation dictionary for generating the search query used in searching for the illegitimate content; and a search query generation part for generating the search query using the associated wording registered in the query generation dictionary.

20 Claims, 3 Drawing Sheets

(51) Int. Cl.
  *G06F 16/245* (2019.01)
  *G06F 21/10* (2013.01)
  *G06F 40/289* (2020.01)
  *G06F 40/58* (2020.01)
(52) U.S. Cl.
  CPC ............ *G06F 40/289* (2020.01); *G06F 40/58* (2020.01); *G06F 21/1015* (2023.08)

(56) References Cited

U.S. PATENT DOCUMENTS

| | | | |
|---|---|---|---|
| 10,536,482 B2* | 1/2020 | Gabaev | H04L 63/1425 |
| 10,764,313 B1* | 9/2020 | Mushtaq | G06N 20/00 |
| 11,165,793 B2* | 11/2021 | Mushtaq | H04L 63/1425 |
| 11,212,089 B2* | 12/2021 | Khandani | H04L 9/3273 |
| 11,316,848 B2* | 4/2022 | Ahuja | H04L 63/1416 |
| 11,429,712 B2* | 8/2022 | Ortiz | G06Q 20/4014 |
| 11,494,380 B2* | 11/2022 | Rao | H04L 67/10 |
| 2008/0177834 A1 | 7/2008 | Gruhl et al. | |
| 2009/0324006 A1 | 12/2009 | Lu et al. | |
| 2017/0286544 A1 | 10/2017 | Hunt et al. | |
| 2023/0224329 A1* | 7/2023 | Lee | H04L 63/1433 726/22 |

OTHER PUBLICATIONS

Ikeda, Kazushi, "Detection of Illegal and Hazardous Information Using Dependency Relations and Keyword Abstraction," DEIM Forum 2010, C9-5.
Ikeda, Kazushi, "Harmful Site Detection Method Based on HTML Element," INformation Processing Society of Japan Journal vol. No. 52 8 2474-2483, Aug. 2011.
Sasho, Akiyo, "Improved Accuracy in the Extraction of Privacy-related Words," Information Processing Society of Japan Research Report, vol. 2014-ICS-177 No. 12 Dec. 15, 2014.

* cited by examiner

| TYPE | NOTATION | NUMBER OF PIECES OF RELEVANT PHRASE-INCLUDING CONTENT | NUMBER OF PIECES OF ILLEGITIMATE CONTENT | ILLEGITIMATE CONTENT RATIO |
|---|---|---|---|---|
| LEGITIMATE EXPRESSION | MOVIE TITLE | 500 | 100 | 20.0% |
| NOTATION FLUCTUATION 1 | MO/VI/E/TI/T/LE | 30 | 28 | 93.3% |
| NOTATION FLUCTUATION 2 | MOV O TITLE | 5 | 5 | 100.0% |
| ... | ... | ... | ... | ... |
| FOREIGN LANGUAGE NOTATION 1 | Movie title | 750 | 500 | 66.7% |
| FOREIGN LANGUAGE NOTATION 2 | 동영상 제목 | 100 | 50 | 50.0% |
| ... | ... | ... | ... | ... |

Fig. 3

ILLEGAL CONTENT SEARCH DEVICE, ILLEGAL CONTENT SEARCH METHOD, AND PROGRAM

CROSS-REFERENCE TO RELATED APPLICATIONS

This application is a U.S. 371 Application of International Patent Application No. PCT/JP2019/007497, filed on 27 Feb. 2019, which application claims priority to and the benefit of JP Application No. 2018-059681, filed on 27 Mar. 2018, the disclosures of which are hereby incorporated herein by reference in their entireties.

TECHNICAL FIELD

The present invention relates to an illegitimate content search device, an illegitimate content search method, and a program that search for illegitimate content posted by an unauthorized person, who is not the owner of legitimate content.

BACKGROUND ART

Recently, due to the development of communication network technology and the progress in communication terminals such as smartphones and personal computers (PCs), many content delivery sites to and from which content such as a video can be uploaded and downloaded have been established. Users can easily upload content to this type of content delivery sites, and thus the number of pieces of content uploaded on such content delivery sites is increasing year by year. Such content delivery sites have the problem that illegitimate content relevant to legitimate content is illegitimately uploaded by unauthorized persons, who are not the owner of the legitimate content. Therefore, there is a demand for a technology for detecting illegitimate content.

For example, Non-Patent Literature 1 discloses a method for detecting an illegal and harmful document by extracting a phrase characteristically appearing in the illegal and harmful document, and learning a group of segments of the document that have dependency relation to each other.

Furthermore, Non-Patent Literature 2 discloses a method for detecting a harmful site from among a large number of sites accessible via communication networks. In this method, character strings contained in the Hyper Text Markup Language (HTML) of a harmful site are statistically learned by a Support Vector Machine (SVM), and a site whose HTML contains the character string extracted based on the learning is detected as a harmful site.

CITATION LIST

Non Patent Literatures

[NPL 1] Kazushi IKEDA, and other three "Detection of Illegal and Hazardous Information Using Dependency Relations", DEIM Forum 2010 C9-5

[NPL 2] Kazushi IKEDA, and other five, "Detection of Illegal and Hazardous Information Based on HTML Elements", Transactions of Information Processing Society of Japan, Vol. 52, No. 8, P. 2474-2483

SUMMARY OF THE INVENTION

Technical Problem

In an illegitimate content search as described above, a search query is created based on the title or the like of legitimate content, and based on the created search query, possible content, which is possibly illegitimate content and is acquired from a content acquisition source such as a content delivery site. Then, the acquired possible content is compared to the legitimate content, and it is determined whether or not the possible content is the illegitimate content. Here, creating a search query using a phrase characteristically appearing in an illegal and harmful document increases the probability that content relevant to content desired by a user will be extracted.

However, an unauthorized person that posts illegitimate content may give a title of the illegitimate content such that it allows a viewer to recognize its relevance to legitimate content while preventing the illegitimate content from being found. In this case, there may be cases where the illegitimate content cannot be extracted appropriately.

In view of the aforementioned problems, it is an object of the present invention to provide an illegitimate content search device, an illegitimate content search method, and a program that can achieve a more appropriate search for illegitimate content.

Means for Solving the Problem

In order to solve the aforementioned problems, an illegitimate content search device according to the present invention is configured to search for illegitimate content posted by an unauthorized person, who is not the owner of legitimate content, the device including:
 a query creation dictionary storing unit configured to store a query creation dictionary for creating a search query to be used in searching for the illegitimate content;
 a query creation dictionary generating unit configured to extract, from a title of the illegitimate content, a relevant phrase that is relevant to a phrase included in a title of the legitimate content, and registers the extracted relevant phrase in a query creation dictionary for creating a search query to be used in searching for the illegitimate content; and
 a search query creating unit configured to create the search query using the relevant phrase registered in the query creation dictionary.

Furthermore, in order to solve the aforementioned problems, an illegitimate content search method according to the present invention is for searching for illegitimate content posted by an unauthorized person, who is not the owner of legitimate content, the method including:
 a step of storing a query creation dictionary for creating a search query to be used in searching for the illegitimate content;
 a step of extracting, from a title of the illegitimate content, a relevant phrase that is relevant to a phrase included in a title of the legitimate content, and registering the extracted relevant phrase in a query creation dictionary for creating the search query to be used in searching for the illegitimate content; and
 a step of creating the search query using the relevant phrase registered in the query creation dictionary.

Moreover, in order to solve the aforementioned problems, a program according to the present invention causes a computer to function as the above-described illegitimate content search device.

Effects of the Invention

According to the illegitimate content search device, the illegitimate content search method, and the program of the present invention, it is possible to can achieve a more appropriate search for illegitimate content.

DESCRIPTION OF EMBODIMENTS

Hereinafter, embodiments of the present invention will be described with reference to the drawings.

Figure 1:
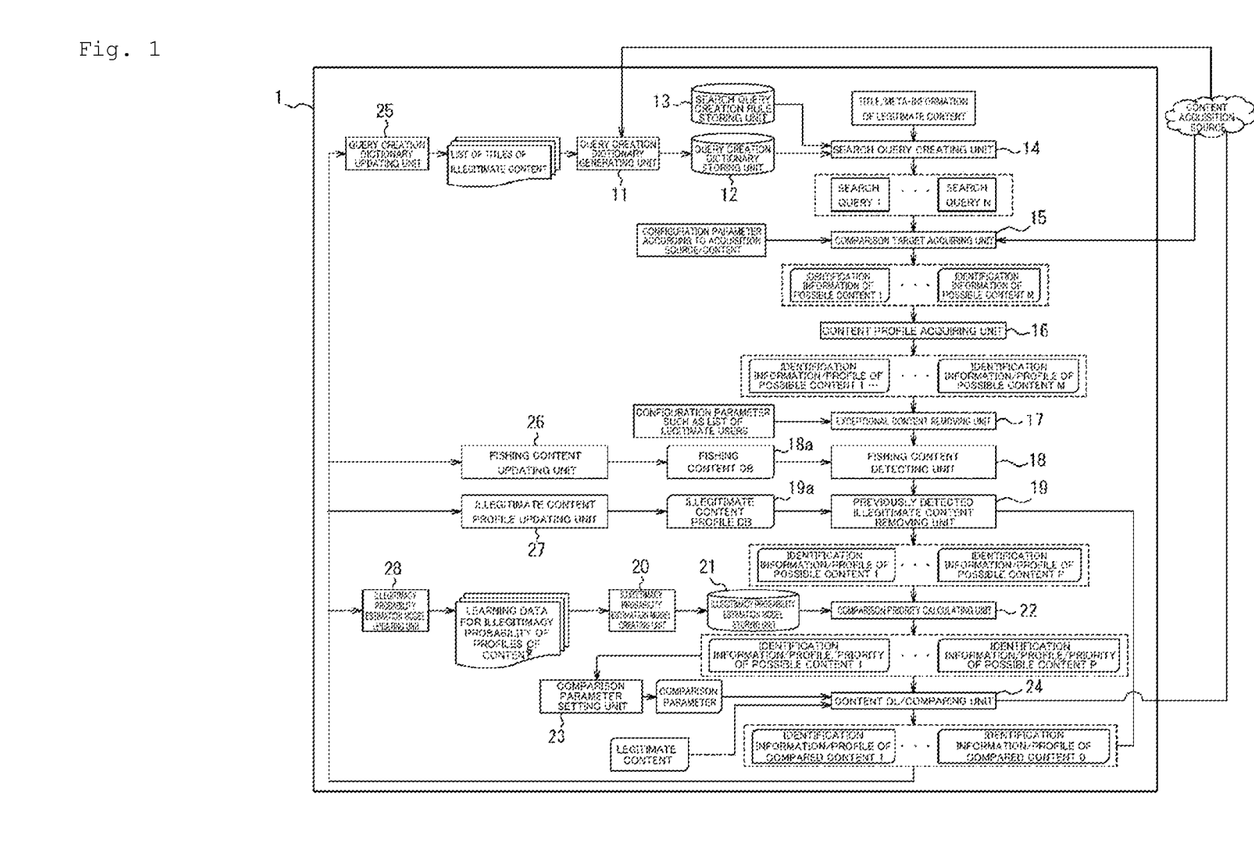
FIG. 1 is a functional block diagram showing an example of a configuration of an illegitimate content search device according to an embodiment of the present invention.

FIG. 1 is a functional block diagram showing an example of a configuration of an illegitimate content search device 1 according to an embodiment of the present invention.

The illegitimate content search device 1 shown in FIG. 1 includes: a query creation dictionary generating unit 11; a query creation dictionary storing unit 12; a search query creation rule storing unit 13; a search query creating unit 14; a comparison target acquiring unit 15; a content profile acquiring unit 16; an exceptional content removing unit 17; a fishing content detecting unit 18; a previously detected illegitimate content removing unit 19; an illegitimacy probability estimation model creating unit 20; an illegitimacy probability estimation model storing unit 21; a comparison priority calculating unit 22; a comparison parameter setting unit 23; a content downloading (DL)/comparing unit 24; a query creation dictionary updating unit 25; a fishing content updating unit 26; an illegitimate content profile updating unit 27; and an illegitimacy probability estimation model updating unit 28.

The illegitimate content search device 1 uses a search query based on, for example, the title of legitimate content (legitimate title) and meta-information thereof to search for illegitimate content stored in a content acquisition source on the Internet. "Illegitimate content" refers to content that is relevant to legitimate content and was posted by an unauthorized person, who is not the owner of the legitimate content. "Meta-information" refers to attribute information attached to legitimate content. Meta-information includes, for example, a subtitle, the cast of the content, a character name, the episode number, the date and time of broadcast, the cast, the abbreviated name, the category of the content, and the like.

"Content acquisition source" refers to a site that is present on the Internet, and on and from which content can be posted, browsed, and downloaded, for example. In response to a request from a posting user, the content acquisition source accepts posting of content from a communication terminal, and stores the posted content. Furthermore, the content acquisition source allows, in response to a request from a user, the user to download stored content onto a communication terminal. Note that the content acquisition source is, for example, a server device that manages a content posting site and the like, a distributed system constituted by a plurality of server devices, a cloud service, or the like. Also, "posting" means uploading content so that the uploaded content is stored. Furthermore, "posting user" means a user who posts content, among users who use a content acquisition source.

Examples of the content acquisition source include a user posting-type content posting site, a web search site, a curation website of illegitimate content Uniform Resource locators (URLs), and a parasitic-type content sharing site.

"User posting-type content posting site" is a site on which a user can acquire (browse and download, for example) content posted on this site by performing a search using a search query. In the user posting-type content posting site, search results are ranked based on site-specific criteria.

"Web search site" is a site on which a user can acquire content existing on the Internet in a cross-over manner by performing a search using a search query. In the web search site, search results are ranked based on site-specific criteria.

"Curation website of illegitimate content URLs" is a site on which links to illegitimate content are put together by a site administrator. Because it is operated by manpower, content derived from the curation website of illegitimate content URLs is highly likely to be illegitimate content.

"Parasitic-type content sharing site" is a site on which content posted on another site such as a user posting-type content posting site can be shown and reproduced.

The above-described user posting-type content posting site and the like include a site that has the function of allowing a user to acquire, for each type of content, a certain number of content (relevant content) that is highly relevant to this content. For specification of the relevant content, site-specific criteria are provided such that, for example, another piece of content used by many users who use that content is regarded as relevant content. If the original content to which the relevant content is associated is illegitimate content, similarly, the relevant content is also highly likely to be illegitimate content. The illegitimate content search device 1 also acquires such relevant content from a content acquisition source. There may be cases where, by acquiring relevant content, illegitimate content that cannot be found by a search using a search query based on the title or the like of the content can be found. Note however that, because there may also be cases where content that is not relevant to the content a user wants to find is often included, the user needs to appropriately determine as to whether or not to use relevant content.

The query creation dictionary generating unit 11 extracts, from the title of illegitimate content, a relevant phrase that is relevant to a phrase included in the title of legitimate content (legitimate title), and registers the extracted relevant phrase into a query creation dictionary. The query creation dictionary is a dictionary in which phrases for creating a search query to be used in illegitimate content search are registered. For example, the query creation dictionary generating unit 11 extracts, as a relevant phrase, a notation fluctuation phrase, a foreign language notation, or the like with respect to the legitimate title, and registers the extracted phrase in the query creation dictionary.

Also, the query creation dictionary generating unit 11 may use the extracted relevant phrase to search a content acquisition source. The query creation dictionary generating unit 11 may also acquire, from search results, the number of pieces of content (relevant phrase-including content) whose title includes the relevant phrase, the number of pieces of illegitimate content in the relevant phrase-including content, and the ratio of the illegitimate content to the relevant phrase-including content (illegitimate content ratio), and register them in the query creation dictionary in association with the relevant phrase. In other words, the query creation dictionary generating unit 11 may also calculate the illegitimate content ratio, which is the ratio of the number of pieces of illegitimate content whose title includes the relevant phrase to the number of pieces of relevant phrase-including content whose title includes the relevant phrase, and register the calculated ratio in the query creation dictionary in association with the relevant phrase.

An illegal posting user, who posts illegitimate content, often posts the illegitimate content with the title obtained by intentionally modifying a legitimate title, so that the posted illegitimate content is prevented from being found and deleted by the owner or the like. For example, the title of illegitimate content may be obtained by converting all or part of a legitimate title into a similar phrase (notation fluctuation phrase) such as a Kana word, a Kanji word, a Romanized word, or an abbreviation. The title of illegitimate content may also be obtained by converting all or part of a legitimate title into a foreign language notation. There may be cases where illegitimate content whose title was changed in such a manner cannot be found even by performing a search using a search query created based on the legitimate title. Accordingly, by acquiring a phrase actually used in illegitimate content and registering the acquired phrase in the query creation dictionary for creating a search query, it is possible to collect a wider range of illegitimate content.

Figure 2:
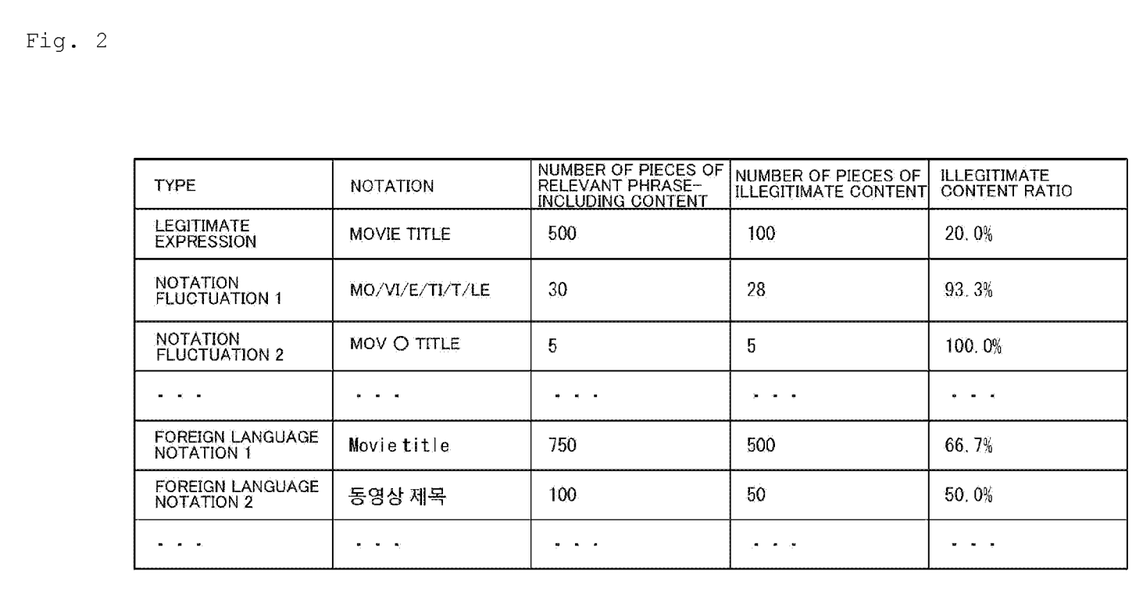
FIG. 2 is a diagram showing an example of a configuration of a query creation dictionary generated by a query creation dictionary generating unit shown in FIG. 1.

FIG. 2 is a diagram showing an example of a configuration of the query creation dictionary generated by the query creation dictionary generating unit 11.

As shown in FIG. 2, the query creation dictionary generating unit 11 registers the title of the legitimate content in the query creation dictionary. Furthermore, the query creation dictionary generating unit 11 registers, as relevant phrases, notations actually used in illegitimate content, such as a notation fluctuation phrase and a foreign language notation with respect to a phrase (notation) used to create a search query, such as "legitimate title", "subtitle", or "date of broadcast", in the query creation dictionary. The query creation dictionary generating unit 11 also registers the type of each phrase as to whether the registered phrase is a correct expression obtained from the legitimate title, a notation fluctuation phrase thereof, or a foreign language notation thereof, in the query creation dictionary.

Also, the query creation dictionary generating unit 11 may also search a content acquisition source to obtain the number of pieces of relevant phrase-including content whose title includes any of the extracted relevant phrases, the number of pieces of illegitimate content whose title includes any of the relevant phrases relative to the relevant phrase-including content, and the illegitimate content ratio, which is the ratio of the illegitimate content to the relevant phrase-including content, and register the obtained information in the query creation dictionary in association with the relevant phrase. By obtaining and registering indexes that are useful in finding illegitimate content, such as the number of pieces of relevant phrase-including content, the number of pieces of illegitimate content relative to the relevant phrase-including content, and the illegitimate content ratio, it is possible to generate a more useful dictionary for creating a search query.

The illegitimate content search device 1 according to the present embodiment is based on the assumption that a relevant phrase is extracted from the title of content known as being illegitimate, so that the number of phrases registered in the query creation dictionary is increased. Accordingly, the query creation dictionary generating unit 11 collects relevant phrases, using a title to which a label indicating that it is illegitimate or non-illegitimate was added by manpower, the title of content determined as illegitimate content by the later-described content DL/comparing unit 24, and the like, and registers the collected relevant phrases into the dictionary. If the title of content determined as illegitimate content by the content DL/comparing unit 24 is used, a notation fluctuation phrase that is frequently used and the like may be obtained from an external resource or created in accordance with a predetermined rule, for example, and may be registered in the query creation dictionary as initial state phrases, until the sufficient number of titles of illegitimate content are collected. Specifically, a phrase obtained by converting a legitimate title into a Kana notation, a phrase obtained by converting the legitimate title into a Romanized notation, a foreign language notation acquired from, for example, a dictionary site on the Internet, and the like may also be registered in the query creation dictionary, as initial state phrases.

The following will describe procedures in which a notation fluctuation phrase and a foreign language notation are acquired from the title of illegitimate content, and are registered in the query creation dictionary. First, the procedure in which a notation fluctuation phrase is acquired based on the title of illegitimate content, and is registered in the query creation dictionary will be described.

The query creation dictionary generating unit 11 extracts, from a list of titles of illegitimate content, a group of titles that does not include a phrase completely matching the phrase registered in the query creation dictionary, and regards the extracted group of titles as a processing target. In other words, the query creation dictionary generating unit 11 removes, from the processing target, any title that includes a phrase completely matching the phrase registered in the query creation dictionary.

Then, the query creation dictionary generating unit 11 performs language analysis (for example, morphological analysis) on the extracted group of titles, and divides the text of the title of content into phrases.

Then, the query creation dictionary generating unit 11 extracts, from the phrases (phrases obtained by dividing the title of content) obtained through the language analysis, a phrase whose appearance frequency is higher than a predetermined value. Note that the criteria for extracting such a phrase may also be such that a phrase classified into a specific parse through the language analysis, a phrase determined as a title portion through the syntax analysis, or the like is extracted.

Then, the query creation dictionary generating unit 11 calculates the edit distance of the extracted phrase to the phrase registered in the query creation dictionary. In other words, the query creation dictionary generating unit 11 calculates the edit distance of the phrase included in the title of the illegitimate content to the phrase registered in the query creation dictionary. Specifically, the query creation dictionary generating unit 11 calculates the edit distance of, from among the phrases included in the title of the illegitimate content, a phrase whose appearance frequency is higher than the predetermined value, to the phrase registered in the query creation dictionary. Note that an edit distance is a type of distance indicating how different two character strings are. An edit distance is defined as the minimum number of times the procedure needs to be performed to modify one character string into the other character string by inserting, deleting, or replacing one character. The smaller edit distance indicates that the two character strings are hardly different from each other. The query creation dictionary generating unit 11 extracts, as a notation fluctuation phrase, a phrase whose edit distance is equal to or smaller than a predetermined value.

Then, the query creation dictionary generating unit 11 performs a search for content on a content acquisition source, using a phrase whose edit distance to the phrase registered in the query creation dictionary is equal to or smaller than the predetermined value, as a search query. Then, the query creation dictionary generating unit 11 obtains, for a predetermined number of higher rank phrases in the number of pieces of relevant phrase-including content obtained through the search, the number of pieces of illegitimate content in the relevant phrase-including content, and the illegitimate content ratio, and registers a phrase for which the values of these items are equal to or greater than predetermined values, as a relevant phrase (notation fluctuation phrase), in the query creation dictionary. The query creation dictionary generating unit 11 may register a phrase whose edit distance to the phrase registered in the query creation dictionary is equal to or smaller than a predetermined value, as a relevant phrase (notation fluctuation phrase), in the query creation dictionary. Note however that, as described later, by setting the number of pieces of illegitimate content in the relevant phrase-including content obtained through the search using an extracted phrase, and the illegitimate content ratio as indexes for the registration in the query creation dictionary, it is possible to generate a higher-quality query creation dictionary. Note that the query creation dictionary generating unit 11 determines whether or not the found content is illegitimate, using video/sound comparison.

As illegitimate content from which a notation fluctuation phrase is to be extracted, content other than the content obtained through a normal search, namely for example, relevant content or content derived from a curation website of illegitimate content URLs are preferably used. These types of content often include content that cannot be found through a normal search, and there is a high likelihood that a new notation fluctuation phrase can be acquired. However, because relevant content also includes many pieces of non-illegitimate content, it is preferable to perform video/sound comparison before extracting a phrase, and use only the content determined as being illegitimate.

The following will describe two procedures in which a foreign language notation is acquired from the title of illegitimate content, and is registered in the query creation dictionary. The first procedure for acquiring a foreign language notation from the title of illegitimate content, and registering the acquired foreign language notation in the query creation dictionary will be described first. The first procedure is a procedure for acquiring a foreign language notation from a foreign language title put down with the Japanese title.

The query creation dictionary generating unit 11 performs language analysis on the title of illegitimate content, and divides the text of the title of the content into phrases.

Then, the query creation dictionary generating unit 11 extracts, from the phrases obtained through the language analysis, a co-occurrence phrase whose co-occurrence appearance frequency with respect to the Japanese title (a legitimate title and a relevant phrase (notation fluctuation phrase) registered in the query creation dictionary) is equal to or greater than a predetermined value. The co-occurrence phrase can be extracted using, for example, a statistical model such as Word2Vec.

Then, the query creation dictionary generating unit 11 performs language determination on the extracted co-occurrence phrase, and extracts a phrase determined as being in a foreign language as a foreign language notation.

Then, the query creation dictionary generating unit 11 performs a search for content on the content acquisition source, using the phrase extracted as a foreign language notation, as a search query. Then, the query creation dictionary generating unit 11 obtains, for a predetermined number of higher rank phrases in the number of pieces of relevant phrase-including content obtained through the search, the number of pieces of illegitimate content in the relevant phrase-including content, and the illegitimate content ratio, and registers a phrase for which the values of these items are equal to or greater than predetermined values, as a relevant phrase (foreign language notation), in the query creation dictionary. Note that the query creation dictionary generating unit 11 determines whether or not the found content is illegitimate, using video/sound comparison.

The query creation dictionary generating unit 11 may extract, from the titles of illegitimate content, a co-occurrence phrase whose co-occurrence appearance frequency with respect to the title of the legitimate content, or the relevant phrase (notation fluctuation phrase) registered in the query creation dictionary is equal to or greater than a predetermined value, and, if the extracted co-occurrence phrase is in a language different from that of the title of the legitimate content, the query creation dictionary generating unit 11 may register this co-occurrence phrase as a relevant phrase (foreign language notation), in the query creation dictionary. Note however that, as will be described later, by setting the number of pieces of illegitimate content in the relevant phrase-including content obtained through the search using an extracted phrase, and the illegitimate content ratio, as indexes for the registration in the query creation dictionary, it is possible to generate a higher-quality query creation dictionary.

The following will describe the second procedure for acquiring a foreign language notation from the title of illegitimate content, and registering the acquired foreign language notation in the query creation dictionary. The second procedure is a procedure of acquiring a foreign language notation by translating a Japanese title into the foreign language title.

The query creation dictionary generating unit 11 translates a Japanese legitimate title into a foreign language title. Here, the query creation dictionary generating unit 11 may extract and use not only a word obtained by a simple literal translation of the Japanese legitimate title but also a word having a similar meaning derived from a thesaurus (dictionary of synonyms). With this measure, it is possible to create a variety of foreign language notations.

Then, the query creation dictionary generating unit 11 performs a search for content on the content acquisition source, using the translated phrase as a search query. Then, the query creation dictionary generating unit 11 obtains, for a predetermined number of higher rank phrases in the number of pieces of relevant phrase-including content obtained through the search, the number of pieces of illegitimate content in the relevant phrase-including content, and the illegitimate content ratio, and registers for which the values of these items are equal to or greater than predetermined values, as a relevant phrase (foreign language notation), in the query creation dictionary. Note that the query creation dictionary generating unit 11 determines whether or not the found content is illegitimate, using video/sound comparison.

The query creation dictionary generating unit 11 may also register a phrase obtained by converting the title of legitimate content into a language different from the language of this title, as a relevant phrase (foreign language notation), in the query creation dictionary. Note however that, as will be described later, by setting the number of pieces of illegitimate content in the relevant phrase-including content obtained through the search using an extracted phrase, and the illegitimate content ratio, as indexes for the registration in the query creation dictionary, it is possible to generate a higher-quality query creation dictionary.

In the above-described procedures of acquiring a relevant phrase from the title of illegitimate content, and registering the acquired relevant phrase in the query creation dictionary, the purpose of the language analysis is to divide the text of the title of the content into phrases. There are various methods of language analysis, but a common method is to learn and use appropriate division of a task using word division with morphological analysis or syntax analysis, or a statistical model such as a conditional random field (CRF) model.

Morphological analysis is often sufficient if the text is in Japanese. On the other hand, if the text is in foreign languages, the accuracy of division may be reduced using a common morphological analysis device. Therefore, it is desirable to use a model learned division of foreign language phrases with a statistical learning method such as a CRF model. Furthermore, if sufficient pieces of learning data can be prepared, it may be better to construct and use a statistical model dedicated for phrase division even if the text is in Japanese, in order to achieve accurate phrase division. Therefore, the language analysis method can be selected as appropriate. If sufficient learning data cannot be prepared, phrase division may be performed automatically by preparing a dictionary of break characters (such as a space, a colon, and parentheses) and designing a rule. In a method using morphological analysis, the accuracy of division depends on the dimension of a dictionary of morphological analysis. On the other hand, in a method using the above-described break character, the accuracy of division does not depend on the dimension of a dictionary, and thus more accurate phrase division can be performed than in the method using morphological analysis, depending on the situation.

Furthermore, in the above-described procedure in which a relevant phrase is acquired based on the title of illegitimate content, and is registered in the query creation dictionary, the number of pieces of illegitimate content in the relevant phrase-including content acquired through a search using the extracted phrase, and the illegitimate content ratio are set as indexes for the registration in the query creation dictionary. As described above, the query creation dictionary is used to create a search query for searching for illegitimate content. Here, even if the number of phrases registered in the query creation dictionary is increased, only using the appearance frequency of a phrase in the title of illegitimate content as a criterion, there is a likelihood that the quality of search results may deteriorate, such as a case where the search results do not include illegitimate content. Accordingly, as in the present embodiment, by setting the number of pieces of illegitimate content in the relevant phrase-including content obtained through a search using an extracted phrase, and the illegitimate content ratio as indexes for the registration in the query creation dictionary, it is possible to generate a high quality query creation dictionary that can detect illegitimate content with more accuracy.

Referring again to FIG. 1, the query creation dictionary storing unit 12 stores the query creation dictionary.

The search query creation rule storing unit 13 stores a search query creation rule, which is a rule for creating a search query. Commonly, an effective search query differs depending on the category of illegitimate content to be searched for. The search query creation rule storing unit 13 stores, as a search query creation rule, a phrase combining rule for each category of illegitimate content to be searched for, for example.

As an example of the search query creation rule, there is a rule that a search query obtained by combining the title and a subtitle of content (for example, "title subtitle") is created. Also, as another search query creation rule, there is a rule that a search query obtained by combining the title of content and the date thereof (for example, "title 20170101", that is, "title 2017 January first") is created. Furthermore, as yet another search query creation rule, there is a rule that a search query obtained by combining the title of content and the episode number thereof (for example, "title first episode", or "title ep. 1") is created. As yet another search query creation rule, there is a rule that a search query obtained by combining the title of content and the cast is created. As yet another search query creation rule, there is a rule that a search query obtained by combining an abbreviated name of the title of content and the date thereof is created. As yet another search query creation rule, there is a rule that a search query including a notation fluctuation phrase of the title of content is created. As yet another search query creation rule, there is a rule that a search query obtained by combining a foreign language notation of the title of content and the date thereof is created. Note that the above-described examples are only illustrative, and a search query can be created by combining any types of meta-information.

The search query creating unit 14 creates a search query using a relevant phrase registered in the query creation dictionary based on the title of legitimate content (legitimate title) and meta-information thereof. Here, the search query creating unit 14 creates a search query according to the search query creation rule stored in the search query creation rule storing unit 13. As described above, an effective search query differs depending on the category of illegitimate content to be searched for. Accordingly, it is effective to create a query, using meta-information suitable for the category of illegitimate content to be searched for. Examples of the search query creation rule according to the category of illegitimate content to be searched for include a phrase combining rule for each category of illegitimate content to be searched for. When, according to this rule, a search query for searching for illegitimate content that is relevant to televised content is created, the search query creating unit 14 will create a search query that includes the date of broadcast if the content belongs to a variety show category, and will create a search query including the episode number if the content belongs to a drama/animation category.

As described above, the query creation dictionary stores a relevant phrase, and the ratio of illegitimate content to relevant phrase-including content acquired through a search using this relevant phrase, in association with each other. The search query creating unit 14 may select, based on the illegitimate content ratio registered in the query creation dictionary, a relevant phrase to be used to create a search query. For example, the search query creating unit 14 may also create a search query preferentially using a relevant phrase with a higher illegitimate content ratio, among the relevant phrases registered in the query creation dictionary. With this measure, it is expected to obtain search results that include many pieces of illegitimate content.

The search query creating unit 14 outputs the created search queries (search queries 1 to N) to the comparison target acquiring unit 15.

The comparison target acquiring unit 15 uses the search queries output from the search query creating unit 14 to search a content acquisition source on a communication network. Also, the comparison target acquiring unit 15 determines the content that was found as the content whose title matches any of the search queries, as possible content, which is possibly illegitimate content, and acquires the identification information of the possible content from the content acquisition source. "Identification information" refers to information for uniquely identifying possible content, and is, for example, the content address on the Internet, that is, a URL.

Specifically, the comparison target acquiring unit 15 uses the search queries output from the search query creating unit 14 to cause the content acquisition source to extract, from a content group, one or more pieces of content whose title includes any of the search query. Then, the comparison target acquiring unit 15 determines a certain number of pieces of content from among the content extracted by the content acquisition source, as possible content, and acquires the identification information of the possible content. For example, the comparison target acquiring unit 15 determines, from among the content extracted as having a higher matching degree to the search queries, a predetermined number of pieces of content having higher matching degrees, as the possible content, and acquires the identification information thereof.

If the content posting tendency in the content acquisition source, and the content posting tendency of a posting user are apparent, the ratio of included illegitimate content can be increased, by setting the number of pieces of possible content whose identification information is to be acquired (the number of acquisitions) by the comparison target acquiring unit 15 to an appropriate value that corresponds to the posting tendency. For example, the number of acquisitions may be set to a large value, for a content acquisition source that has a tendency that many pieces of illegitimate content in a specific category (such as dramas and animations), or a posting user having a high rate of posting illegitimate content. The number of acquisitions that corresponds to a content acquisition source or the posting tendency of a posting user may be stored in advance as a configuration parameter in the form of a list by the comparison target acquiring unit 15, for example.

The comparison target acquiring unit 15 outputs the acquired identification information of the pieces of possible content (possible content 1 to M) to the content profile acquiring unit 16.

The content profile acquiring unit 16 acquires the profiles of the possible content identified based on the identification information output from the comparison target acquiring unit 15. The profile of possible content refers to information relating to the possible content, and includes, for example, the title of the possible content, the content length (e.g. time length), posting time (elapsed time from the release date of the legitimate content until the possible content is posted), the number of views, a thumbnail image, a content acquisition source, the number of subscribers (number of favorites registered by site users), the number of comments and comment texts added to the content, the illegitimate content-relating number, and the like.

"Thumbnail image" refers to a static image that can be acquired from video content and represents the content. The criteria for acquiring a thumbnail image, the number of images to be acquired, and the like differ depending on the content acquisition source. Furthermore, the illegitimate content-relating number refers to the number of pieces of illegitimate content associated with the possible content. In the illegitimate content search device 1, for each piece of the illegitimate content that was searched for, association of this illegitimate content with relevant content can be stored. The content profile acquiring unit 16 can acquire, based on such association, the number of pieces of illegitimate content associated with the possible content. The illegitimate content-relating number is an essential profile that contributes to the degree of illegitimacy.

Furthermore, the profile of possible content may also include the profile of the user who has posted the possible content, for example, the user account name, the date on which the user account was generated, the summary of the user account, the number of subscribers of the user account, the titles of the posted content and relevant content, the deletion history of posted content, the frequency of posting of content, the number of views of posted content and transition thereof, information as to whether or not illegitimate content has been posted, the ratio of included illegitimate content, the type of editing tendency, and the like.

The content profile acquiring unit 16 performs video/sound comparison between content previously posted by a posting user and the legitimate content, or thumbnail image comparison between the content previously posted by a posting user and the illegitimate content, and calculates whether or not illegitimate content has ever been posted in the history, and the ratio of illegitimate content included in the posted content. Note that such comparison is troublesome. Accordingly, the content profile acquiring unit 16 may store the acquired information of the posting users who has ever posted the information in a list so that it can be referenced, and update the list on a regular basis. Furthermore, the content profile acquiring unit 16 determines, at the time of the comparison, whether or not there is special editing processing such as, for example, cutting and editing, time warping, Picture in Picture (PinP) processing, and acquires the type of determination tendency. In general, content subjected to such special editing processing as described above is highly likely to be illegitimate content.

Furthermore, the profile of the possible content may also include a profile relating to the degree of public topicality. Examples of the profile relating to the degree of public topicality include a score or ranking of a phrase for which the number of searches has rapidly increased, the score or ranking being able to be acquired from a search service such as a Social Networking Service (SNS) or news services. Also, if the possible content relates to a TV program, the profile relating to the degree of public topicality is, for example, the audience rate of the TV program.

For content having a higher degree of public topicality, there is a high demand for illegitimate content relevant thereto, and there is a high likelihood that many pieces of illegitimate content are posted. Acquiring the profile indicating the degree of public topicality as described above is useful in effectively searching for illegitimate content.

The content profile acquiring unit 16 outputs the identification information and the acquired profiles of the possible content (possible content 1 to M) to the exceptional content removing unit 17.

Based on the profile of the possible content output from the content profile acquiring unit 16, the exceptional content removing unit 17 determines exceptional content, which is less likely to be illegitimate content and is to be removed from possible illegitimate content. Specifically, if the profile of possible content satisfies a predetermined condition, the exceptional content removing unit 17 determines this possible content as exceptional content, and removes it from the possible content. The predetermined condition is that, for example, the user account of a posting user who has posted the possible content included in the profile is of a legitimate user. Furthermore, the predetermined condition is that, for example, the posting time included in the profile is before the release of the legitimate content. Furthermore, the predetermined condition is that, for example, the content length included in the profile is extremely short (for example, about a few seconds). The predetermined condition is not limited to these, and may be any condition as long as it indicates that the possible content is not likely to be illegitimate content.

The exceptional content removing unit 17 outputs, to the fishing content detecting unit 18, the identification information and the profiles of the possible content that has not been determined as exceptional content and thus not been removed.

The fishing content detecting unit 18 detects, using the profiles of the possible content output from the exceptional content removing unit 17, fishing content, which is non-illegitimate content for inducing a user to browse, from among the possible content.

Possible content may include content, that is, so-called fishing content that is non-illegitimate, but pretends as if it is illegitimate content and deceives a user who wants to use illegitimate content in order to increase the numbers of audience and reproductions. Fishing content has characteristics, similar to that of illegitimate content, in the profile that serves as guidelines for human to determine use of the content, such as the title, the content length, and the thumbnail image, and appears to be illegitimate content at the first glance. "Fishing content" is content whose actual items itself are non-illegitimate items, and that is not subjected to deletion of the owner or the like. Because such fishing content is used by many users by mistake, the fishing content often tends to be included near the top of the search results, and may thus be included in the possible content. Accordingly, by detecting fishing content, and removing the detected fishing content from the possible content or lowering the priority for performing later-described comparing processing, it is possible to improve the efficiency of an illegitimate content search.

The following will describe an example of the method for detecting fishing content.

First, a detecting method using the title of possible content will be described.

If the title in the profile of possible content includes a legitimate title, the fishing content detecting unit 18 detects this possible content as possible fishing content.

In contrast to illegitimate content, fishing content tends to be posted with exactly the same title as the legitimate title, so as to be likely to be found by users. Accordingly, content with exactly the same title as the legitimate title is highly likely to be fishing content. Therefore, the fishing content detecting unit 18 detects, if the title of possible content includes a legitimate title, the possible content as possible fishing content. Then, the fishing content detecting unit 18 performs a refine search for fishing content on the possible content detected as possible fishing content (detection of fishing content).

The following will describe methods of a refine search for fishing content. The first method is a method using the title of possible content.

If the title included in the profile of the possible content detected as possible fishing content contains a predetermined character string registered in advance in a fishing content database (DB) 18a, the fishing content detecting unit 18 detects this possible content as fishing content.

The title of fishing content tends to include, for example, a phrase such as "charge-free" or "trick" that fascinates a user of illegitimate content. Therefore, content whose title includes such a predetermined character string is highly likely to be fishing content. Accordingly, if the title of the possible content detected as possible fishing content contains a predetermined character string as described above, the fishing content detecting unit 18 detects this possible content as fishing content. Note that the predetermined character string for use in detecting fishing content can be extracted by the same method as the above-described method in which a co-occurrence phrase is extracted, using the title of fishing content as learning data.

The following will describe a second method of a refine search for fishing content. In this detecting method, it is assumed that a list of identification information (user account names) of posting users who have ever posted fishing content is registered in the fishing content DB 18a.

If the identification information of a posting user of possible content detected as possible fishing content that is included in the profile of the possible content is registered in advance in the fishing content DB 18a, the fishing content detecting unit 18 detects this possible content as fishing content.

The account of a user who posts fishing content tends to be less likely to be deleted than that of a user who posts illegitimate content. Also, a user who posts fishing content tends to post only fishing content. Accordingly, if the identification information of a posting user of possible content is registered in the fishing content DB 18a, which manages identification information of users who have ever posted fishing content in a list, the fishing content detecting unit 18 detects this possible content as fishing content.

The fishing content detecting unit 18 determines the possible content detected as fishing content by, for example, one of the above-described methods, as fishing content. Note that the above-described example has been described taking a case where, if the title included in the profile of possible content includes a legitimate title, the fishing content detecting unit 18 detects this possible content as possible fishing content, but the present invention is not limited to this. The fishing content detecting unit 18 may determine the possible content whose title included in the profile includes a legitimate title, as fishing content.

As described above, a predetermined character string that is highly likely to be included in the title of fishing content, and the identification information of a user who has ever posted fishing content are registered in the fishing content DB 18a. In the illegitimate content search device 1, by updating the fishing content DB 18a based on newly detected fishing content, it is possible to improve the accuracy in detection of fishing content.

The fishing content detecting unit 18 outputs the identification information and the profiles of possible content other than the possible content determined as fishing content, to the previously detected illegitimate content removing unit 19. That is, the fishing content detecting unit 18 removes the content determined as fishing content from the possible content. Alternatively, the fishing content detecting unit 18 may give, to the profile of the content determined as fishing content, a flag indicating that this content is fishing content, and may output it to the previously detected illegitimate content removing unit 19.

The previously detected illegitimate content removing unit 19 detects, based on the profiles of the possible content output from the fishing content detecting unit 18, the content whose profile is identical to the profile of previously detected illegitimate content (they have the degree of similarity of a predetermined value or more).

Among posting users of illegitimate content, there are some users who post, even if the posted illegitimate content is deleted by the owner or the like, repeatedly the same illegitimate content. There are also some users who post illegitimate content that was posted by other users, without change. For the same content, the plurality of items of profile completely match each other. Accordingly, if the degree of similarity between the profile of collected possible content and the profile of already (previously) detected illegitimate content is high, this possible content can be estimated as illegitimate content. Accordingly, the previously detected illegitimate content removing unit 19 determines possible content whose profile is identical to the profile of the previously detected illegitimate content as illegitimate content, without performing later-described comparing processing. As a result, it is possible to reduce the number of pieces of possible content to be compared with the legitimate content, and the efficiency of the search for illegitimate content can be improved. In the following, the content whose profile is identical to the profile of previously detected illegitimate content and that was detected by the previously detected illegitimate content removing unit 19 because it is estimated as illegitimate content may also be referred to as presumed illegitimate content.

The previously detected illegitimate content removing unit 19 uses, as a profile serving as a criterion for determining identity, at least one of a thumbnail image, a content length, a content title, and a user account name.

The previously detected illegitimate content removing unit 19 determines, as presumed illegitimate content, the possible content whose profile matches the profile of previously detected illegitimate content as described above, or the possible content whose profile has a difference from the profile of previously detected illegitimate content of a predetermined threshold or less. Also, the previously detected illegitimate content removing unit 19 gives, to the content determined as presumed illegitimate content, a flag indicating that this content is illegitimate content, and adds the content to a later-described list of compared content. Also, the previously detected illegitimate content removing unit 19 removes the possible content determined as presumed illegitimate content from the possible content.

Note that, for the processing performed by the previously detected illegitimate content removing unit 19, the profiles of the previously detected illegitimate content need to be registered in the illegitimate content profile DB 19*a*. Accordingly, in an initial state in which no profile of illegitimate content is registered in the illegitimate content profile DB 19*a*, the previously detected illegitimate content removing unit 19 does not perform the processing.

The following will describe a method for determining the identity using thumbnail images (thumbnail image comparing method).

The previously detected illegitimate content removing unit 19 compares a thumbnail image included in the profile of possible content with a thumbnail image included in the profile of previously detected illegitimate content registered in the illegitimate content profile DB 19*a*, and calculates the degree of similarity therebetween. Thumbnail image comparison is performed for all combinations between all of the thumbnail images included in the profile of the possible content, and all of the thumbnail images included in the profile of the previously detected illegitimate content. For example, if it is assumed that the profile of the possible content includes four thumbnail images, and the profile of the previously detected illegitimate content includes one-hundred thumbnail images, the previously detected illegitimate content removing unit 19 will perform the comparison four-hundred times, for each piece of possible content. The previously detected illegitimate content removing unit 19 uses, for thumbnail image comparison, an algorithm such as dHash (difference hash) that is unlikely to be affected by image editing processing, for example.

Note that, for example, a thumbnail image of the content that was acquired in advance from a video posting site and was determined as illegitimate content as a result of video comparison is registered in the illegitimate content profile DB 19*a* in association with this content.

If the comparison is performed for all of the combinations between all of the thumbnail images included in the profile of the possible content, and all of the thumbnail images included in the profile of the previously detected illegitimate content, the burden of the comparing processing is large. Accordingly, if the profile of the previously detected illegitimate content includes one or more thumbnail images (similar thumbnail image) similar to one thumbnail image, the previously detected illegitimate content removing unit 19 may eliminate this similar thumbnail image from the target with which the thumbnail images of possible content are to be compared. With this measure, it is possible to reduce the burden of the comparing processing.

The previously detected illegitimate content removing unit 19 outputs the identification information and profiles of the possible content (possible content 1 to P) other than the possible content determined as presumed illegitimate content, to the comparison priority calculating unit 22.

The illegitimacy probability estimation model creating unit 20 creates an illegitimacy probability estimation model that has statistically learned the relationship between the profile of content and the probability (illegitimacy probability) that this content is illegitimate content. As the learning data for use in creating the illegitimacy probability estimation model, data on the profiles of content to which an illegitimate/non-illegitimate label was attached is used. Preferably, an operator visually checks the content to determine whether it is illegitimate or non-illegitimate, and then attaches the illegitimate/non-illegitimate label to the content. A criterion for determining whether it is illegitimate or non-illegitimate may be based on, for example, whether the content includes a predetermined number or more of the same portions as legitimate content.

Any model can be used as a statistical model as long as it is suitable for language learning. Note however that, because a priority needs to be given, it is desirable to use a model such as an SVM that can calculate the estimated illegitimacy probability as a numerical value. Any well-known method can be used as a specific method for creating an illegitimacy probability estimation model. For example, an example of the method is described in "Introduction to machine learning for natural language processing (Supervising editor: Manabu OKUMURA, Writer: Hiroya TAKAMURA, Coronasha, pp. 101 to 117)".

When performing statistical learning, the illegitimacy probability estimation model creating unit 20 needs to convert the value of a profile into a value manageable in leaning. The following will describe an example of a method for converting a profile.

The illegitimacy probability estimation model creating unit 20 converts, for example, the text of the title or the user account name of content based on a Bag-of-Words format. In the case of the Bag-of-Words format, the illegitimacy probability estimation model creating unit 20 gives the label that corresponds to the number of times of appearances of a specific phrase in the text. For example, the illegitimacy probability estimation model creating unit 20 gives a label "1" to the text if a phrase "high-definition" characteristically appearing in illegitimate content is included in this text once or more times, and otherwise gives a label "0" to the text. For example, the illegitimacy probability estimation model creating unit 20 gives the label "1" to the text "movie title first episode high-definition HD", and gives the label "0" to the text "movie title first episode".

Furthermore, the illegitimacy probability estimation model creating unit 20 classifies a content length, posting times, the number of views, content acquisition sources, user posting history, and the like into classes, based on the values thereof. For example, the illegitimacy probability estimation model creating unit 20 classifies a content length into three classes, namely, "10 minutes or less", "10 to 60 minutes", and "60 minutes or more". Furthermore, the illegitimacy probability estimation model creating unit 20 classifies posting times into three classes, namely, "1 day or less", "1 day to 1 week", and "1 week or more". Furthermore, the illegitimacy probability estimation model creating unit 20 classifies the number of views into three classes, namely, "1000 times or less", "1000 to 10000 times", and "10000 times or more". Furthermore, the illegitimacy probability estimation model creating unit 20 classifies content acquisition sources into the same number of classes as the number of content acquisition sources, for example, "A for a video site 1", "B for a video site 2", and "C for a curation website 1". Furthermore, the illegitimacy probability estimation model creating unit 20 classifies user posting history into two classes, namely, "1 for a case where a user has ever posted illegitimate content" and "0 for a case where a user has never posted illegitimate content".

Note that the above-described number of classification classes and the above-described thresholds for the classification are merely examples, and suitable values need only to be designed according to variance of the values of learning data and the design policy of the illegitimacy probability estimation model, for example. Furthermore, if numerical values are used, the numerical values may be normalized and treated as continuous values, instead of classification.

The illegitimacy probability estimation model storing unit 21 stores the illegitimacy probability estimation model created by the illegitimacy probability estimation model creating unit 20.

The comparison priority calculating unit 22 calculates, based on the profiles of a plurality of pieces of possible content (possible content 1 to P) output from the previously detected illegitimate content removing unit 19, the priority of the plurality of pieces of possible content when determining whether or not the plurality of pieces of possible content are illegitimate content. That is to say, the comparison priority calculating unit 22 determines, for each of the plurality of pieces of possible content, the priority, which serves as the order in which it is subjected to later-described comparing processing with the legitimate content. More specifically, the comparison priority calculating unit 22 calculates, based on the profiles of the plurality of pieces of possible content output from the previously detected illegitimate content removing unit 19, the illegitimacy probability of the plurality of pieces of the possible content, and gives a higher priority to the content the higher the illegitimacy probability is. The processing for comparing possible content with legitimate content takes time, and it is often difficult to subject all of the possible content to comparison. Therefore, the comparison is performed in the descending order of the illegitimacy probability, and the priority is determined in order that an illegitimate content search is performed efficiently.

The priority can be determined based on statistical learning or the design of rules. For the profile that gives alone a large influence on the illegitimacy probability, it is efficient to design rules individually, and give a higher priority to the possible content that conforms to the rule. On the other hand, if a plurality of profiles function in a complex manner and the illegitimacy probability can be determined, it is efficient to use a method with statistical learning for learning relationships between a plurality of profiles and the illegitimacy probability. When the statistical learning is used, a large number of pieces of learning data are needed, and thus it is sufficient to determine the priority, by selecting an efficient method or combining efficient methods based on the amount of learning data that can be prepared and the types of the profiles that can be acquired.

The following will describe a profile that efficiently functions due to a designed rule, and an example of the designed rules.

The profile that efficiently functions due to a designed rule may be the title of content. The content whose title includes a phrase similar to a legitimate title is highly likely to be illegitimate content that a user desires to find. Accordingly, it is efficient to set a rule using the title of content. For example, a method is conceivable in which a rule is designed such that the descending priority of possible content is determined in the order from the smallest edit distance between the title of possible content and the legitimate title, that is, in the order from the smallest difference in a character string between the title of possible content and the legitimate title. Also, a method is also conceivable in which a rule is designed such that the edit distance not only to the legitimate title, but also to a relevant phrase (a notation fluctuation phrase or a foreign language notation) registered in the query creation dictionary is calculated. In this case, the number of pieces of illegitimate content registered in association with the relevant phrase, and the illegitimate content ratio may also be used to determine the priority. For example, it is also possible to determine the priority by calculating the edit distances to, among relevant phrases registered in the query creation dictionary, a plurality of relevant phrases having higher illegitimate content ratio, and using the score obtained by weighting and summing up the calculated edit distances, as a criterion.

Furthermore, the profile that efficiently functions due to a designed rule may be a content acquisition source. For example, possible content derived from an illegitimate content curation website on which illegitimate content URLs are put together by manpower may be highly likely to be illegitimate content. Accordingly, a method is also conceivable for designing a rule that a higher priority is given to possible content that is acquired from an illegitimate content curation website. According to this rule, the comparison priority calculating unit 22 gives a higher priority to possible content derived from a predetermined content acquisition source (for example, an illegitimate content curation website) than possible content derived from other content acquisition sources.

Also, the comparison priority calculating unit 22 may also calculate the priority using the content length included in the profile of possible content. Typically, if the content length of possible content is extremely shorter than the content length of a legitimate content, this possible content is not likely to be illegitimate content. Accordingly, the comparison priority calculating unit 22 may give a lower priority to possible content the shorter the content length of the possible content is than a predetermined value that corresponds to the content length of the legitimate content (for example, about several % of the content length of the legitimate content).

Furthermore, the comparison priority calculating unit 22 may calculate the priority using the posting time included in the profile of possible content. Typically, there is a tendency in which a demand for illegitimate content relevant to legitimate content increases immediately after the legitimate content was released, and the demand decreases over time. Accordingly, the number of times of posting of illegitimate content is large within a predetermined period of time from the release of the legitimate content, and decreases when the predetermined period elapses. Accordingly, the comparison priority calculating unit 22 may give a higher priority to the possible content, the shorter the posting time of the possible content (period of time from the release of legitimate content until the possible content is posted) is.

Also, the comparison priority calculating unit 22 may use the number of pieces of illegitimate content with which the possible content is associated, the number being included in the profile of the possible content. Typically, if relevant content relevant to possible content is illegitimate content, the possible content is also highly likely to be illegitimate content. Therefore, the comparison priority calculating unit 22 may also give a higher priority to the possible content, the larger the number of pieces of illegitimate content with which the possible content is associated.

Furthermore, the comparison priority calculating unit 22 may also calculate the priority using the illegitimate content posting history included in the profile of possible content. Typically, possible content posted by a user who has ever posted illegitimate content is highly likely to be illegitimate content. Therefore, the comparison priority calculating unit 22 may give a higher priority to the illegitimate content in a case where the posting history includes a record of the fact that the user has ever posted the illegitimate content, than in a case where the posting history does not include such a record of the fact that the user has ever posted the illegitimate content.

Note that the above-described profile that the comparison priority calculating unit 22 uses to calculate the priority is merely an example, and it is possible to calculate the priority using various items included in the profile of possible content.

When determining the priority using an illegitimacy probability estimation model, the comparison priority calculating unit 22 calculates the illegitimacy probability using the illegitimacy probability estimation model, based on the profile of the possible content output from the previously detected illegitimate content removing unit 19, and gives a higher priority to the content the higher the calculated illegitimacy probability is. Specifically, the comparison priority calculating unit 22 inputs the profile of the possible content to the illegitimacy probability estimation model, and performs classification of the possible content as to whether it is illegitimate or non-illegitimate, and calculation of the illegitimacy probability. Then, the comparison priority calculating unit 22 gives a higher priority to the content the higher the calculated illegitimacy probability is.

The comparison priority calculating unit 22 may determine the priority, using in addition to the profile relating to the illegitimacy probability of content, the profile relating to the degree of public topicality together. As described above, the profile relating to the degree of public topicality corresponds to a phrase for which the number of searches has rapidly increased and that can be acquired from search services such as SNS or news services, and the program audience rate, for example. Typically, it is conceivable that if content has a higher degree of public topicality, there is a higher demand for illegitimate content relevant thereto. Accordingly, it may be preferable to preferentially treat possible content that has a high degree of public topicality even if it has a lower illegitimacy probability than content that has a low degree of public topicality. Specifically, the comparison priority calculating unit 22 gives a higher priority to possible content the higher the degree of public topicality is. As a result of using the profile relating to the degree of public topicality, it is possible to determine an appropriate priority even in such a case.

If the profile relating to the degree of public topicality is used through statistical learning, a statistical model that has learned the relationships between the profile relating to characteristics of the content and the posting user, and the illegitimacy probability, and a statistical model that has learned the relationships between the profile relating to the degree of public topicality, and the illegitimacy probability are prepared. Then, the comparison priority calculating unit 22 determines the priority using, for example, the score obtained by weighting and summing up the scores calculated based on the respective statistical models.

The comparison priority calculating unit 22 outputs, to the comparison parameter setting unit 23 and the content DL/comparing unit 24, identification information, the profiles, and the determined priorities of the possible content (possible content 1 to P), except for the exceptional content, the fishing content, and the presumed illegitimate content detected by the previously detected illegitimate content removing unit 19.

The comparison parameter setting unit 23 sets, using a configuration parameter list stored in advance, comparison parameters for use in the comparing processing based on the characteristics of the possible content. "Comparing processing" refers to processing for determining whether or not possible content and legitimate content match each other. "Configuration parameters" include, for example, a frame length, and a comparison method. "Frame length" is the length of a frame serving as a basic unit of comparison in the comparing processing. "Comparison method" includes a method for performing comparison using sounds, a method for performing comparison using images, and the like.

Any known method may be used as the comparison method. An example of the method is described in, for example, "Media Content Identification Technology and its Applications (Takahito KAWANISHI, and other two, The Japan Society for Industrial and Applied Mathematics, Applied mathematics 21(4), pp. 289 to 292, Dec. 22, 2011".

"Configuration parameter list" is a list in which appropriate settings are described that correspond to the profile of possible content or a combination of the profiles. The profile of possible content used in the configuration parameter list is to estimate the frame length required to almost ensure the comparison accuracy, and is for example, a category. If the category of the possible content is mashup content in sports, the possible content is configured by editing a short video of about several seconds. Accordingly, the configuration parameter list includes, for example, a setting of a short frame length (for example, about 2 to 3 seconds) that corresponds to the category of mashup content in sports. Accordingly, the content DL/comparing unit 24 performs the comparing processing with the set short frame length, and can accurately detect the possible content that matches the legitimate content.

On the other hand, if the possible content is a drama or a movie, the content length is about from several tens of minutes to several hours. Therefore, the configuration parameter list includes, for example, a setting of a long frame length (for example, about five minutes) that corresponds to the category of a drama or a movie. Accordingly, the content DL/comparing unit 24 performs the comparing processing with the set long frame length, and can accurately detect the possible content that matches the legitimate content.

Furthermore, the profile of possible content used in the configuration parameter list may also be, for example, an editing method. The editing method is a method of editing performed on the content, and includes, for example, PinP in which an image (child frame) is embedded into another image (parent frame), time warping, and the like. The comparison parameter setting unit 23 may determine the method for editing the possible content according to the type of user editing tendency acquired by the content profile acquiring unit 16.

For example, if the method for editing possible content is PinP, and the same image as the image of legitimate content is embedded into another image, the entire image of the possible content will be recognized as being different from the legitimate content. Accordingly, in the comparing processing using images, the possible content and the legitimate content are not determined as having a high matching degree. Accordingly, the configuration parameter list includes, for example, a setting of performing comparison using sounds for PinP serving as the editing method. Accordingly, the content DL/comparing unit 24 performs comparison using sounds, and can accurately detect the possible content that matches the legitimate content.

Furthermore, if the method for editing possible content is time warping, the sound of the possible content largely differ from the sound of the legitimate content in feature amount. Accordingly, if the possible content is obtained by subjecting the legitimate content to time warping, in the comparing processing using sounds, the possible content and the legitimate content are not likely to be determined as having a high matching degree. Accordingly, the configuration parameter list includes, for example, a setting of performing comparison using images for time warping serving as the editing method. Accordingly, the content DL/comparing unit 24 performs comparison using images, and can accurately detect the possible content that matches the legitimate content.

The content DL/comparing unit 24 downloads (acquires) the possible content from the content acquisition source in the descending order from the highest priority calculated by the comparison priority calculating unit 22. Then, the content DL/comparing unit 24 compares the downloaded possible content with the legitimate content in accordance with the setting made by the comparison parameter setting unit 23, and thereby determines whether or not the possible content matches the legitimate content. The content DL/comparing unit 24 determines the possible content that matches the legitimate content as illegitimate content.

Furthermore, the content DL/comparing unit 24 may download the possible content having a long content length (for example, video content of several tens of minutes to several hours), and may start comparison from the downloaded portion in parallel with the downloading. In this case, if it is determined that the possible content and the legitimate content match each other, the content DL/comparing unit 24 stops downloading the possible content thereafter. Then, the content DL/comparing unit 24 downloads the possible content with second higher priority and performs comparison therewith. Accordingly, the content DL/comparing unit 24 can shorten the time necessary for comparison of a single piece of possible content, that is, can increase the number of pieces of possible content to be compared per unit time.

The content DL/comparing unit 24 outputs, as search results, a list of the compared content to the query creation dictionary updating unit 25, the fishing content updating unit 26, the illegitimate content profile updating unit 27, and the illegitimacy probability estimation model updating unit 28. Specifically, the content DL/comparing unit 24 outputs the identification information and the profiles of the compared content as search results. Here, the content DL/comparing unit 24 outputs the identification information and the profile of each piece of the possible content determined as illegitimate content, together with the label that indicates that this possible content is illegitimate content. Also, the content DL/comparing unit 24 outputs the identification information and the profile of each piece of the possible content determined as fishing content, together with the label that indicates that this possible content is fishing content. Note that the content DL/comparing unit 24 determines, as fishing content, the possible content whose title perfectly matches the legitimate title, and whose degree of matching with the legitimate content is a predetermined value or smaller, for example.

Based on the search results of the content DL/comparing unit 24, the query creation dictionary updating unit 25 updates the list of titles of illegitimate content to be input to the query creation dictionary generating unit 11. Specifically, the query creation dictionary updating unit 25 extracts, from the search results of the content DL/comparing unit 24, the profile (the title and the acquisition source) of the content that has a high matching degree with the legitimate content, that is, the content to which the label indicating that it is illegitimate content is added, updates the list of titles of illegitimate content, and outputs the updated list to the query creation dictionary generating unit 11.

The fishing content updating unit 26 updates the fishing content DB 18*a* based on the search results of the content DL/comparing unit 24. Specifically, the fishing content updating unit 26 extracts, from the search results of the content DL/comparing unit 24, the profile (the title, and the user account name of the posting user) of new fishing content, and registers the extracted profile in the fishing content DB 18*a*. With this measure, even if a new characteristic of fishing content occurs, a countermeasure will be possible, and the accuracy of detection of fishing content can be improved.

The illegitimate content profile updating unit 27 updates the illegitimate content profile DB 19*a* based on the search results of the content DL/comparing unit 24. Specifically, the illegitimate content profile updating unit 27 extracts, from the search results of the content DL/comparing unit 24, the profile of the content to which the label indicating that it is illegitimate content is added, and registers the extracted profile in the illegitimate content profile DB 19*a*. With this measure, it is possible to increase the amount of data for use in removing illegitimate content by the previously detected illegitimate content removing unit 19, and improve the efficiency of a search for illegitimate content.

The illegitimacy probability estimation model updating unit 28 updates, based on the search results of the content DL/comparing unit 24, the learning data for use in creating the illegitimacy probability estimation model. Specifically, the illegitimacy probability estimation model updating unit 28 extracts, from the search results of the content DL/comparing unit 24, the determination result as to whether each piece of content is illegitimate or non-illegitimate and the profile of each piece of content, as learning data that is used by the illegitimacy probability estimation model creating unit 20 to create the illegitimacy probability estimation model, and outputs the extracted determination result and profile to the illegitimacy probability estimation model creating unit 20. With this measure, it is possible to increase the accuracy of the illegitimacy probability estimation model created by the illegitimacy probability estimation model creating unit 20, and improve the efficiency of a search for illegitimate content.

Figure 3:
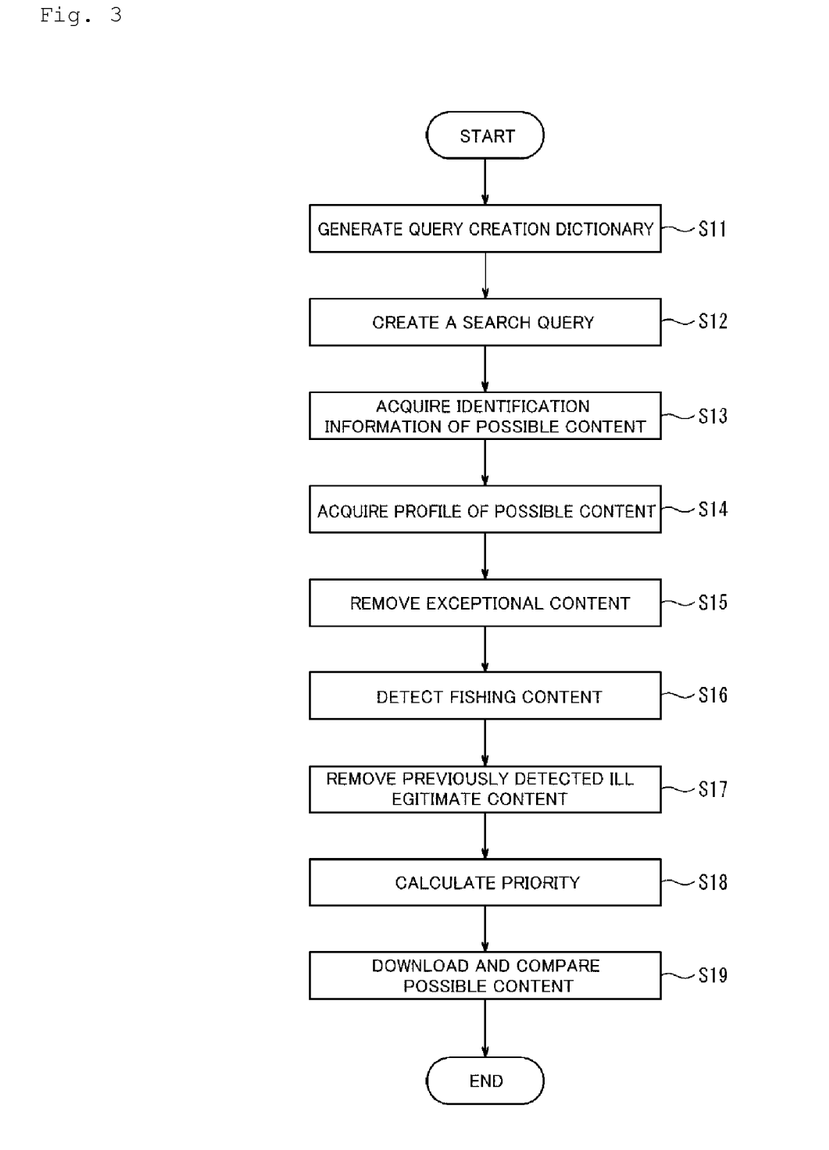
FIG. 3 is a flowchart showing an example of an illegitimate content search method that is executed by the illegitimate content search device shown in FIG. 1.

Hereinafter, the illegitimate content search method that is executed by the illegitimate content search device 1 of the present embodiment will be described with reference to the flowchart shown in FIG. 3. FIG. 3 is a flowchart showing an example of the illegitimate content search method.

First, the query creation dictionary generating unit 11 extracts, from a list of titles of illegitimate content, relevant phrases that are relevant to phrases contained in a legitimate title, and generates a query creation dictionary in which the extracted relevant phrases are registered (step S11).

The search query creating unit 14 creates a search query using a relevant phrase registered in the query creation dictionary based on the legitimate title (step S12).

Upon the creation of the search query by the search query creating unit 14, the comparison target acquiring unit 15 searches a content acquisition source based on the created search query, and acquires the identification information that identifies pieces of possible content found through the search, the possible content possible being illegitimate content (step S13).

Upon the acquisition of the identification information of the possible content by the comparison target acquiring unit 15, the content profile acquiring unit 16 acquires profiles of the possible content (step S14).

Upon the acquisition of the profiles of the possible content by the content profile acquiring unit 16, the exceptional content removing unit 17 removes, based on the acquired profiles, exceptional content whose profile satisfies a predetermined condition from the possible content (step S15).

After the removal of the exceptional content by the exceptional content removing unit 17, the fishing content detecting unit 18 detects, based on the profiles of the possible content, fishing content, which is non-illegitimate content and induces a user to browse, from among the possible content (step S16).

Also, after the removal of the exceptional content by the exceptional content removing unit 17, the previously detected illegitimate content removing unit 19 detects, based on the profiles of the possible content, content (presumed illegitimate content) whose profile is identical to the profile of previously detected illegitimate content (step S17). Note that the processes that are performed by the exceptional content removing unit 17, the fishing content detecting unit 18, and the previously detected illegitimate content removing unit 19 are to achieve a more efficient illegitimate content search, and are not necessarily essential to an illegitimate content search. Accordingly, at least one of the processes of the exceptional content removing unit 17, the fishing content detecting unit 18, and the previously detected illegitimate content removing unit 19 may be omitted.

Then, the comparison priority calculating unit 22 calculates, for each of the piece of possible content whose identification information has been acquired by the comparison target acquiring unit 15 except for the exceptional content, the fishing content, and the presumed illegitimate content, the priority for determining whether or not the corresponding possible content is illegitimate content, based on the profile of the possible content (step S18).

After the priorities of the pieces of possible content have been calculated by the comparison priority calculating unit 22, the content DL/comparing unit 24 downloads, from the content acquisition source, the possible content in the descending order of the priority, compares the downloaded possible content with the legitimate content, and determines whether or not the possible content is illegitimate content (step S19).

As described above, according to the present embodiment, the illegitimate content search device 1 extracts, from the titles of illegitimate content, relevant phrases that are relevant to phrases included in the title of legitimate content, registers the extracted relevant phrases in the query creation dictionary for creating a search query to be used in searching for illegitimate content, and creates a search query using a relevant phrase registered in the query creation dictionary. Accordingly, even if an unauthorized person gives a title that directly appears to be less relevant to the title of the legitimate content to illegitimate content, it is possible to appropriately create a search query for use to extract illegitimate content. Accordingly, it is possible to achieve a more appropriate search for illegitimate content.

Note that the present embodiment has been described using an example in which profiles of possible content acquired by the content profile acquiring unit 16 are used to perform an illegitimate content search, but the present invention is not limited to this. For example, the profiles acquired by the content profile acquiring unit 16 are also applicable to a method for searching for harmful content. For example, when possible content for harmful content is downloaded, and it is determined whether or not the possible content is harmful content, the probability that the possible content is harmful content may be calculated based on the profile of the possible content, and the priority for the determination may be given based on the calculated probability. With this measure, the determination can be performed in the descending order from the possible content with the highest probability of being harmful content, and it is possible to achieve a more efficient search for harmful content. Furthermore, if a profile or the like that characteristically appears in harmful content is known, it will be possible to determine whether or not possible content is harmful content by comparing the profile of the possible content with the profile characteristically appearing in harmful content.

A program for executing processing of a computer that functions as the illegitimate content search device 1 may be provided, although the program is not particularly mentioned in the embodiment. The program may also be stored in a computer-readable medium. Using a computer-readable medium allows a user to install the program into a computer. Here, the computer-readable medium in which the program is stored may also be a non-transitory recording medium. The non-transitory recording medium is not particularly limited, and may also be, for example, a recording medium such as a CD-ROM or a DVD-ROM.

The above-described embodiment has been described as a representative example, but it is apparent to a person skilled in the art that various modifications and replacements may be made within the spirit and limit of the present invention. Therefore, the present invention is not to be construed as being limited to the above-described embodiment, and various modifications and changes may be made without departing from the scope of the claims. For example, a plurality of constituent blocks shown in the drawing of the configuration of the embodiment may be combined into one, or a single constituent block may be divided into a plurality of units.

REFERENCE SIGNS LIST

1 Illegitimate content search device
11 Query creation dictionary generating unit
12 Query creation dictionary storing unit
13 Search query creation rule storing unit
14 Search query creating unit
15 Comparison target acquiring unit
16 Content profile acquiring unit
17 Exceptional content removing unit
18 Fishing content detecting unit
19 Previously detected illegitimate content removing unit
20 Illegitimacy probability estimation model creating unit
21 Illegitimacy probability estimation model storing unit
22 Comparison priority calculating unit
23 Comparison parameter setting unit
24 Content DL/comparing unit
25 Query creation dictionary updating unit
26 Fishing content updating unit
27 Illegitimate content profile updating unit
28 Illegitimacy probability estimation model updating unit

The invention claimed is:

1. A computer-implemented method for determining aspects of content, the method comprising:
   extracting a phrase from a first title of illegitimate content, wherein the phrase relates to one or more phrases in a second title of legitimate content, and wherein the illegitimate content relates to a piece of content posted by an unauthorized user without a legitimate ownership of the piece of content;
   registering the phrase to a query creation dictionary for generating queries for searching the illegitimate content;
   generating, based on the registered phrase, a search query; and
   receiving, based on the generated search query, one or more pieces of candidate content for determining illegitimate content.

2. The computer-implemented method of claim 1, the method further comprising:
   determining an illegitimate content ratio, wherein the illegitimate content ratio indicates a ratio between a first number of pieces of the illegitimate content with titles including the registered phrase and a second number of pieces of the content with titles including the registered phrase;
   registering, in the query creation dictionary, the determined illegitimate content ratio by associating with the registered phrase; and
   selecting, based on the determined illegitimate content ratio, the registered phrase for generating the search query.

3. The computer-implemented method of claim 1, the method further comprising:
   determining an edit distance of the phrase included in the first title of the illegitimate content to one of a plurality of phrases in the query creation dictionary, wherein the edit distance indicates a minimum number of changes of one or more characters required to change the phrase into the one of the plurality of phrases in the query creation dictionary; and
   when the edit distance is less than or equal to a predetermined edit distance, registering the phrase as a notation fluctuation phrase of the one of the plurality of phrases in the query creation dictionary.

4. The computer-implemented method of claim 1, the method further comprising:
   translating the second title of the legitimate content in a first language into a third title of the legitimate content in a second language, wherein the first language and the second language are distinct; and
   registering the third title in the query creation dictionary.

5. The computer-implemented method of claim 1, the method further comprising:
   determining a frequency of phrases in the first title of the illegitimate content co-occurring in either one of the second title of the legitimate content or a plurality of phrases in the query creation dictionary, wherein the first title of the illegitimate content is in a first language;
   extracting a co-occurring phrase based on the determined frequency, wherein the co-occurring phrase is in a second language, and wherein the first language and the second language are distinct; and
   registering, in the query creation dictionary, the extract co-occurring phase in the second language.

6. The computer-implemented method of claim 1, the method further comprising:
   receiving, based on a search in a content acquisition source using the generated search query, identifiers of a plurality of candidate content of the illegitimate content;
   receiving, based on the received identifiers, content profiles of the plurality of candidate content;
   identifying, based on the received content profiles, one or more pieces of phishing content from the plurality of candidate content, wherein the phishing content relate to non-illegitimate content inducing a user to browse information;
   identifying, based on the received content profiles, one or more pieces of presumed illegitimate content, wherein the presumed illegitimate content relates to a first content profile, wherein the first content profile is identical to a second content profile of a piece of previously identified illegitimate content;
   determining, based on the received content profiles, a set of priorities of determining one or more of the candidate content as the illegitimate content from a set of candidate content, wherein the set of candidate content includes the plurality of candidate content without the identified one or more pieces of phishing content and without the identified one or more pieces of presumed illegitimate content;
   receiving, based on the determined set of priorities, the one or more of the candidate content;
   comparing, based on the determined set of priorities, the received one or more of the candidate content with the legitimate content; and
   determining, based on the comparison, at least one piece illegitimate content from the one or more of the candidate content.

7. The computer-implemented method of claim 1, wherein the query creation dictionary includes:
   a type of the phrase;
   a notation of the phrase;
   a number of pieces of content including the phrase; and
   a number of pieces of the illegitimate content, and wherein the type of the phrase includes a legitimate expression, a notation fluctuation, and a notation of the phrase in a foreign language.

8. A system for determining aspects of content, the system comprises:
a processor; and
a memory storing computer-executable instructions that when executed by the processor cause the system to:
extract a phrase from a first title of illegitimate content, wherein the phrase relates to one or more phrases in a second title of legitimate content, and wherein the illegitimate content relates to a piece of content posted by an unauthorized user without a legitimate ownership of the piece of content;
register the phrase to a query creation dictionary for generating queries for searching the illegitimate content;
generate, based on the registered phrase, a search query; and
receive, based on the generated search query, one or more pieces of candidate content for determining illegitimate content.

9. The system of claim 8, the computer-executable instructions when executed further causing the system to:
determine an illegitimate content ratio, wherein the illegitimate content ratio indicates a ratio between a first number of pieces of the illegitimate content with titles including the registered phrase and a second number of pieces of the content with titles including the registered phrase;
register, in the query creation dictionary, the determined illegitimate content ratio by associating with the registered phrase; and
search, based on the determined illegitimate content ratio, the registered phrase for generating the search query.

10. The system of claim 8, the computer-executable instructions when executed further causing the system to:
determine an edit distance of the phrase included in the first title of the illegitimate content to one of a plurality of phrases in the query creation dictionary, wherein the edit distance indicates a minimum number of changes of one or more characters required to change the phrase into the one of the plurality of phrases in the query creation dictionary; and
when the edit distance is less than or equal to a predetermined edit distance, register the phrase as a notation fluctuation phrase of the one of the plurality of phrases in the query creation dictionary.

11. The system of claim 8, the computer-executable instructions when executed further causing the system to:
translate the second title of the legitimate content in a first language into a third title of the legitimate content in a second language, wherein the first language and the second language are distinct; and
register the third title in the query creation dictionary.

12. The system of claim 8, the computer-executable instructions when executed further causing the system to:
determine a frequency of phrases in the first title of the illegitimate content co-occurring in either one of the second title of the legitimate content or a plurality of phrases in the query creation dictionary, wherein the first title of the illegitimate content is in a first language;
extract a co-occurring phrase based on the determined frequency, wherein the co-occurring phrase is in a second language, and wherein the first language and the second language are distinct; and register, in the query creation dictionary, the extract co-occurring phase in the second language.

13. The system of claim 8, the computer-executable instructions when executed further causing the system to:
receive, based on a search in a content acquisition source using the generated search query, identifiers of a plurality of candidate content of the illegitimate content;
receive, based on the received identifiers, content profiles of the plurality of candidate content;
identify, based on the received content profiles, one or more pieces of phishing content from the plurality of candidate content, wherein the phishing content relate to non-illegitimate content inducing a user to browse information;
identify, based on the received content profiles, one or more pieces of presumed illegitimate content, wherein the presumed illegitimate content relates to a first content profile, wherein the first content profile is identical to a second content profile of a piece of previously identified illegitimate content;
determine, based on the received content profiles, a set of priorities of determining one or more of the candidate content as the illegitimate content from a set of candidate content, wherein the set of candidate content includes the plurality of candidate content without the identified one or more pieces of phishing content and without the identified one or more pieces of presumed illegitimate content;
receive, based on the determined set of priorities, the one or more of the candidate content;
compare, based on the determined set of priorities, the received one or more of the candidate content with the legitimate content; and
determine, based on the comparison, at least one piece illegitimate content from the one or more of the candidate content.

14. The system of claim 8, wherein the query creation dictionary includes:
a type of the phrase;
a notation of the phrase;
a number of pieces of content including the phrase; and
a number of pieces of the illegitimate content, and
wherein the type of the phrase includes a legitimate expression, a notation fluctuation, and a notation of the phrase in a foreign language.

15. A computer-readable non-transitory recording medium storing computer-executable instructions that when executed by a processor cause a computer system to:
extract a phrase from a first title of illegitimate content, wherein the phrase relates to one or more phrases in a second title of legitimate content, and wherein the illegitimate content relates to a piece of content posted by an unauthorized user without a legitimate ownership of the piece of content;
register the phrase to a query creation dictionary for generating queries for searching the illegitimate content;
generate, based on the registered phrase, a search query; and
receive, based on the generated search query, one or more pieces of candidate content for determining illegitimate content.

16. The computer-readable non-transitory recording medium of claim 15, the computer-executable instructions when executed further causing the system to:
determine an illegitimate content ratio, wherein the illegitimate content ratio indicates a ratio between a first number of pieces of the illegitimate content with titles including the registered phrase and a second number of pieces of the content with titles including the registered phrase;

register, in the query creation dictionary, the determined illegitimate content ratio by associating with the registered phrase; and search, based on the determined illegitimate content ratio, the registered phrase for generating the search query.

17. The computer-readable non-transitory recording medium of claim 15, the computer-executable instructions when executed further causing the system to:

determine an edit distance of the phrase included in the first title of the illegitimate content to one of a plurality of phrases in the query creation dictionary, wherein the edit distance indicates a minimum number of changes of one or more characters required to change the phrase into the one of the plurality of phrases in the query creation dictionary; and when the edit distance is less than or equal to a predetermined edit distance, register the phrase as a notation fluctuation phrase of the one of the plurality of phrases in the query creation dictionary.

18. The computer-readable non-transitory recording medium of claim 15, the computer-executable instructions when executed further causing the system to:

translate the second title of the legitimate content in a first language into a third title of the legitimate content in a second language, wherein the first language and the second language are distinct; and register the third title in the query creation dictionary.

19. The computer-readable non-transitory recording medium of claim 15, the computer-executable instructions when executed further causing the system to:

determine a frequency of phrases in the first title of the illegitimate content co-occurring in either one of the second title of the legitimate content or a plurality of phrases in the query creation dictionary, wherein the first title of the illegitimate content is in a first language;

extract a co-occurring phrase based on the determined frequency, wherein the co-occurring phrase is in a second language, and wherein the first language and the second language are distinct; and register, in the query creation dictionary, the extract co-occurring phase in the second language.

20. The computer-readable non-transitory recording medium of claim 15, the computer-executable instructions when executed further causing the system to:

receive, based on a search in a content acquisition source using the generated search query, identifiers of a plurality of candidate content of the illegitimate content;

receive, based on the received identifiers, content profiles of the plurality of candidate content;

identify, based on the received content profiles, one or more pieces of phishing content from the plurality of candidate content, wherein the phishing content relate to non-illegitimate content inducing a user to browse information;

identify, based on the received content profiles, one or more pieces of presumed illegitimate content, wherein the presumed illegitimate content relates to a first content profile, wherein the first content profile is identical to a second content profile of a piece of previously identified illegitimate content;

determine, based on the received content profiles, a set of priorities of determining one or more of the candidate content as the illegitimate content from a set of candidate content, wherein the set of candidate content includes the plurality of candidate content without the identified one or more pieces of phishing content and without the identified one or more pieces of presumed illegitimate content;

receive, based on the determined set of priorities, the one or more of the candidate content;

compare, based on the determined set of priorities, the received one or more of the candidate content with the legitimate content; and determine, based on the comparison, at least one piece illegitimate content from the one or more of the candidate content.

* * * * *